United States Patent Office 2,948,719
Patented Aug. 9, 1960

2,948,719
N-SUBSTITUTED AZEPINES AND DIHYDRO-AZEPINES

Walter Schindler, Riehen, near Basel, and Franz Häfliger, Basel, Switzerland, assignors to Geigy Chemical Corporation, Ardsley, N.Y., a corporation of Delaware No Drawing. Filed Dec. 11, 1958, Ser. No. 779,557
Claims priority, application Switzerland Dec. 20, 1957

6 Claims. (Cl. 260—239)

The present invention concerns new N-heterocyclic compounds having valuable pharmacological properties, as well as a process for the production thereof.

N-substituted azepines and dihydro-azepines of the general formula

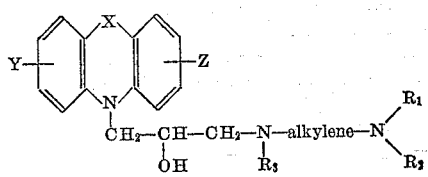

wherein X represents the ethylene or vinylene group, $-CH_2-CH_2-$ or $-CH=CH-$, Y and Z represent hydrogen or halogen atoms, $R_1$ and $R_2$ represent low molecular alkyl radicals, $R_3$ represents hydrogen or a low molecular alkyl radical which, also with $R_2$, can be bound to form an alkylene radical, and alkylene represents an alkylene radical having 2–4 carbon atoms, as well as their monoacid and diacid salts and their quaternary ammonium compounds, have not been known up to now.

It has now been found that these compounds have pharmacologically valuable properties, in particular spasmolytic, antiallergic and hypnotic activity.

In addition they can be used to potentiate the action of pharmaceuticals, as well as for the treatment of nervous disorders.

The new compounds according to the present invention can be produced by reacting a 5-(2'.3'-epoxy-propyl)-azepine or -dihydro-azepine of the general formula

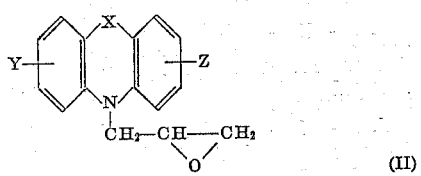

with an alkylene diamine of the general formula

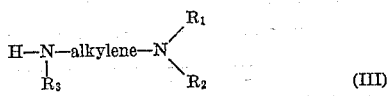

wherein X, Y, Z, $R_1$, $R_2$, $R_3$ and alkylene have the meanings given above and, if desired, converting the reaction products obtained into their salts by treatment with inorganic or organic acids, or converting them into mono- or bis-quaternary ammonium compounds by reaction with reactive esters of aliphatic or araliphatic alcohols.

The reactions of the epoxypropyl compounds with the alkylene diamine can be performed in the presence or absence of solvents or diluents, advantageously in the warm. A slight excess of the alkylene diamine used for the reaction can be used for example as diluent and in this case, the reaction is performed under normal pressure advantageously at temperatures between 100 and 200°. The reaction can also be performed under normal pressure by boiling the components in an inert solvent having a suitable boiling point such as e.g. toluene or xylene. The reaction can also be performed in an autoclave however on using a lower boiling solvent such as e.g. ethanol or methanol.

The starting materials of the general Formula II can be obtained from 10.11-dihydro-5-dibenzo[b.f]azepine, 5-dibenzo[b.f]azepine or the C-substitution products thereof by reacting their alkali-metal compounds, in particular their sodium compounds, with epichlorohydrin. Apart from the iminodibenzyl named in the examples as fundamental compound, suitable 10.11-dihydro-5-dibenzo[b.f]azepines are 1.9-dichloro- and 3.7-dichloro-10.11-dihydro - 5 - dibenzo[b.f]azepine, which can be termed 1.9-dichloro- or 3.7-dichloro-iminodibenzyl. The corresponding 5-dibenzo[b.f]azepines are obtained by N-acylation of the 10.11-dihydro-5-dibenzo[b.f]azepines, bromination in the 10-position by means of bromosuccinimide and successively or simultaneously splitting off hydrogen bromide and hydrolysis, for example with alkali lyes. Apart from the fundamental compound, which will be termed in the following as iminostilbene, examples of such substances are 1.9-dichloro- and 3.7-dichloro-5-dibenzo[b.f]azepine (1.9-dichloro- or 3.7-dichloro-iminostilbene) all of which can be converted in the same manner into their 5-(2'.3'-epoxy-propyl)-derivatives which serve direct as starting materials.

Examples of alkylene diamines of the general Formula III are: N.N-dimethyl- and N.N-diethyl-ethylene diamine, N.N.N'-trimethyl- and N.N.N'-triethyl- ethylene diamine, N.N-dimethyl-N'-ethyl- ethylene diamine, N.N-dimethyl-N'-n-propyl- ethylene diamine, N.N-dimethyl-N'-n-butyl- ethylene diamine, N.N-diethyl-N'-methyl-ethylene diamine, N.N-diethyl-N'-n-propyl-ethylene diamine, N.N-diethyl-N'-n-butyl-ethylene diamine; also, as compounds having radicals $R_2$ and $R_3$ bound to each other: N-methyl-, N-ethyl- and N-n-propyl-piperazine.

The tertiary bases form salts with inorganic or organic acids such as hydrochloric acid, hydrobromic acid, sulphuric acid, phosphoric acid, methane sulphonic acid, ethane disulphonic acid, acetic acid, succinic acid, fumaric acid, maleic acid, malic acid, tartaric acid, citric acid, benzoic acid and phthalic acid. Some of these salts are water soluble. Solutions of mono- or di-acid salts can be produced for example by dissolving the calculated amounts of the components in water or, possibly, in inorganic solvents diluted with water. Quaternary ammonium compounds are formed from the tertiary amines by reacting with reactive esters, in particular halides or sulphates of aliphatic or araliphatic alcohols, e.g. methyl iodide, dimethyl sulphate, ethyl bromide, ethyl iodide, diethyl sulphate, n-propyl bromide, n-butyl bromide, allyl bromide, allyl iodide, benzyl chloride, benzyl bromide or p-chlorobenzyl chloride, the two aliphatically bound nitrogen atoms taking part in the reaction.

The following examples serve to further illustrate the production of the new compounds. Parts are given as parts by weight and their relationship to parts by volume is as that of grammes to cubic centimetres. The temperatures are in degrees centigrade.

Example 1

A suspension of 4 parts of sodium amide in toluene is added dropwise at 40–50° while stirring well to a solution of 39 parts of iminodibenzyl and 20 parts of epichlorohydrin in 120 parts by volume of abs. benzene. Because of the exothermic reaction, the temperature rises to about 65°. On completion of the dropwise addition, the whole is refluxed for about 6 hours, then cooled and water is added. The organic phase is washed with water, dried and concentrated. On distilling the residue, 5-(2'.3'-epoxy-propyl)-iminodibenzyl is obtained, B.P.$_{0.2}$ 165–166°. It can be recrystallised from benzene whereupon it melts at 73–74°.

12.6 parts of distilled 5-(2'.3'-epoxy-propyl)-iminodibenzyl with 8 parts of N.N-dimethyl-N'-n-propyl-ethylene diamine are heated for 16 hours on an oil bath at 180–190°. The mixture is then cooled to 100° and the volatile portions are distilled off in the vacuum at this temperature. The residue is taken up in diluted hydrochloric acid and the hydrochloric acid solution is thoroughly shaken with ether. It is made alkaline with saturated potassium carbonate solution and extracted with ether. The ethereal solution is dried with sodium sulphate, concentrated and the residue is distilled in the high vacuum. The 5-[3'-(N-dimethylaminoethyl-N-n-propylamino)-2'-hydroxypropyl]-iminodibenzyl passes over at 171–172° under 0.002 mm. pressure.

In an analogous manner, on using N.N.N'-trimethyl-ethylene diamine, 5-[3'-(N-dimethylaminoethyl-N-methyl-amino)-2'-hydroxypropyl]-iminodibenzyl (B.P.$_{0.01}$ 184–186°) is obtained; on using N.N-dimethyl-N'-n-butyl-ethylene diamine, 5 - [3' - (N-dimethylaminoethyl-N-n-butylamino)-2'-hydroxypropyl]-iminodibenzyl (B.P. 170–172° under 0.002 mm. pressure) is obtained; on using N.N - diethylethylene diamine, 5 - [3'-(N-diethylamino-ethyl-amino)-2'-hydroxypropyl]-iminodibenzyl (B.P.$_{0.0005}$ 185–187°) is obtained; and on using N-methyl-piperazine, 5 - [3'-(4''-methyl-piperazino)-2'-hydroxypropyl]-imino-dibenzyl is obtained which, on concentrating the ether extract, crystallises and after recrystallisation from ether melts at 136–137°.

*Example 2*

A suspension of 8 parts of sodium amide in abs. toluene is added dropwise at 50° while stirring to a solution of 52.8 parts of 3.7-dichloro-iminodibenzyl and 20 parts of epichlorohydrin in 300 parts by volume of abs. benzene. The whole is stirred for 2 hours at 50–60° and then refluxed for 3 hours. After cooling, water is added to the reaction mixture, the benzene phase is removed, thoroughly washed with water and dried with sodium sulphate. The benzene solution is then concentrated and the residue is boiled out several times with benzine. On concentrating the benzine extracts, the 5-(2'.3'-epoxy-propyl)-3.7-dichloro-iminodibenzyl crystallises out. It melts at 98°.

16 parts of this epoxypropyl compound are heated for 4 hours in an oil bath at 140° with 16 parts of N.N-dimethyl-N'-n-butylethylene diamine. The reaction mixture is then cooled, water is added and the undissolved portions are taken up in ether. The ethereal solution is extracted with diluted hydrochloric acid, the extract is made alkaline with concentrated caustic soda lye and the base which precipitates is taken up in ether. The ethereal solution is dried over sodium sulphate, concentrated and the residue is distilled in the high vacuum. The 5-[3'-(N - dimethylaminoethyl - N-n-butylamino)-2'-hydroxy-propyl]3.7-dichloro-iminodibenzyl passes over at 200° under 0.002 mm. pressure. In an analogous manner on using N.N - diethyl-ethylene diamine, 5-[3'-(N-diethyl-aminoethylamino) - 2'-hydroxypropyl]-3.7-dichloroimino-dibenzyl (B.P. 205° under 0.002 mm. pressure) is obtained. Starting from 3.7-dibromo-iminodibenzyl, 5-[3'-(N - diethylamino-ethylamino)-2'-hydroxypropyl]-3.7-di-bromo-iminodibenzyl is obtained in an analogous manner.

*Example 3*

38.6 parts of iminostilbene are dissolved in 400 parts by volume of abs. benzene while warming and 20 parts of epichlorohydrin are added. A suspension of 8 parts of sodium amide in toluene is then added dropwise at 50–60° within half an hour while stirring well. The reaction mixture is then refluxed for 2 hours, cooled and the solvent is removed in the vacuum. Water is added to the residue whereupon it is thoroughly extracted with ether. The ethereal solution is thoroughly washed with water, dried with sodium sulphate and concentrated. On distilling the residue in the high vacuum from a Hickman flask, the 5-(2'.3'-epoxypropyl)-iminostilbene passes over at 150–160° under 0.02 mm. pressure.

5 parts of 5-(2'.3'-epoxy-propyl)-iminostilbene are heated with 5 parts of N.N.N'-triethyl-ethylene diamine for 6 hours at 130–140°. The reaction mixture which contains the formed 5-[3'-(N-diethylaminoethyl-N-ethyl-amino-N-ethylamino)-2'-hydroxypropyl]-iminostilbene is then cooled, taken up in ether and the ethereal solution is thoroughly washed with water.

What we claim is:

1. A member selected from the group consisting of an N-heterocyclic compound of the formula

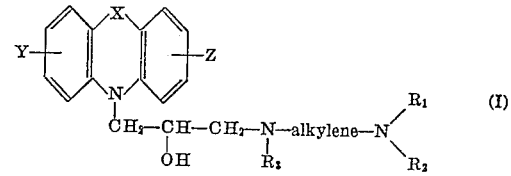

wherein X represents a member selected from the group consisting of the ethylene and vinylene group, Y and Z represent a member selected from the group consisting of hydrogen and halogen atoms, each of $R_1$ and $R_2$ represents a lower alkyl radical, $R_3$ represents a member selected from the group consisting of hydrogen and a lower alkyl radical and $R_2$ and $R_3$ together represent a lower alkylene radical, and "alkylene" represents an alkylene radical having from 2 to 4 carbon atoms, the pharmacologically acceptable acid addition salts of the said compounds, and the pharmacologically acceptable quaternary ammonium salts of the said compounds with lower alkyl halides, lower alkyl sulfates, lower alkenyl halides, benzylhalides and p-chlorobenzyl halides.

2. 5 - [3' - (N-dimethylaminoethyl-N-n-propylamino)-2'-hydroxypropyl]-iminodibenzyl.

3. 5 - [3' - (N-dimethylaminoethyl-N-n-butylamino)-2'-hydroxypropyl]-iminodibenzyl.

4. 5 - [3' - (4''-methyl-piperazino)-2'-hydroxypropyl]-iminodibenzyl.

5. 5 - [3' - (N-dimethylaminoethyl-N-n-butylamino)-2'-hydroxypropyl]-3.7-dichloro-iminodibenzyl.

6. 5 - [3' - (N - diethylaminoethyl-N-ethylamino)-2'-hydroxypropyl]-iminostilbene.

References Cited in the file of this patent

UNITED STATES PATENTS 2,674,596   Hafliger et al. _____ Apr. 6, 1954
2,861,987   Martin et al. _____ Nov. 25, 1958